Sept. 12, 1933.  F. G. SLAGEL  1,926,460
TUBING
Filed May 29, 1930

Inventor
Franklin G. Slagel
By Wayne M. Hart
his Attorney

Patented Sept. 12, 1933

1,926,460

UNITED STATES PATENT OFFICE 1,926,460

TUBING

Franklin G. Slagel, Buffalo, N. Y., assignor to Fedders Manufacturing Company, Inc., Buffalo, N. Y., a corporation of New York Application May 29, 1930. Serial No. 457,449

1 Claim. (Cl. 257—263)

This invention relates to sectional tubing adapted more particularly for use with heat transfer apparatus.

An object of the invention is to join the ends of tubing section together without the use of a union section.

Another object of the invention is to provide a tubing joint which will hermetically and strongly seal two tube sections without a substantial increase in weight or heat transfer efficiency.

A further object of the invention resides in the method of permanently joining two tube sections together in leak proof and communicating relation.

Still another object of the invention resides in the formation of a tube loop and fins which can be readily assembled and secured in permanent relation.

Other objects of the invention will appear from the following description taken in connection with the drawing, which form a part of the specification, and in which.

Figure 1:
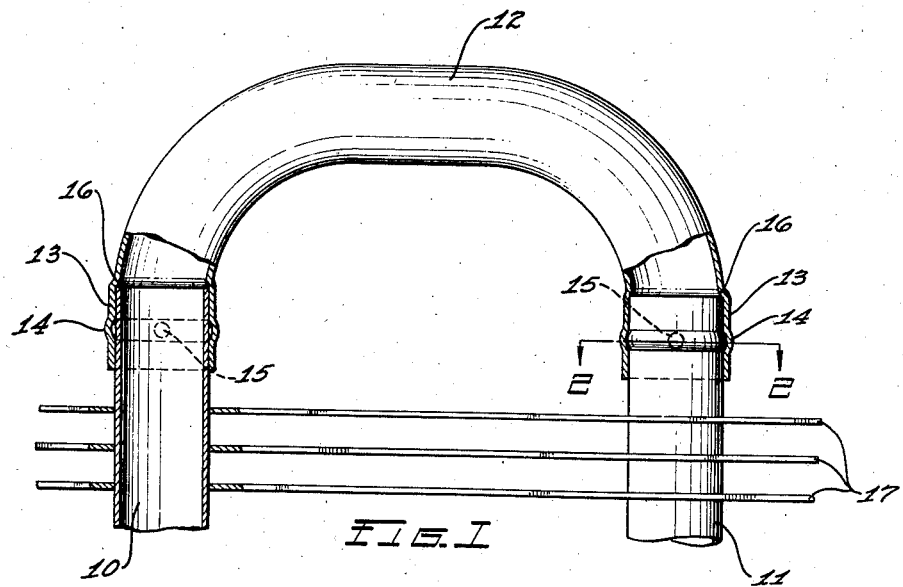
Fig. 1 is a plan view of a tube loop and fins, partially in section, constructed in accordance with the invention.
Figure 2:
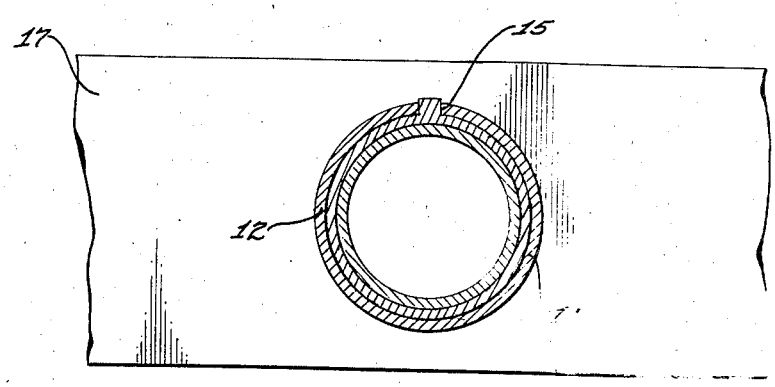
Fig. 2 is a transverse section of the tube loop taken on line 2—2 of Fig. 1.

Referring now to the drawing by characters of reference, 10 and 11 indicate two sheet metal tubes which are connected with a semi-circular tube section 12 to form a loop.

The end portions 13 of the bent section are formed so that the inner diameter is larger than that of the intermediate portion, and of a size to telescopically receive ends of the sections 10 and 11 therein. Such end portions 13 are also formed with a circularly extending bead 14 which forms a circular interior recess or groove, and each bead has an opening 15 punched therein.

There is a slight clearance between the telescoped tube sections and the shoulders 16 provide stops which limit the extent to which the sections 10 and 11 can be inserted into the section 12. Fins 17 provided with apertures are assembled endwise on the tube sections 10 and 11, after which the tube section 12 is telescoped on the straight tube sections. The fins extend transversely across the tube sections 10 and 11 and are in intimate thermal contact therewith thus forming a part of the heat transfer structure.

In order to hermetically seal the telescoping tube section ends in permanent relation, the ends of the sections to be telescoped are covered with a suitable flux and then the section 12 is telescoped thereupon. The joints thus formed are then heated, and solder is pushed into the openings 15. The solder is preferably in stick form, and will run around the grooves formed by the heads 14 and spread evenly around and lengthwise of the portions of the tubes 10 and 11 projecting into the tube 12. In this manner the space between the telescoped ends of the tube sections is filled with solder, which when hardened, forms a sealed rugged joint.

The structure can be readily associated and secured together, and the fins can be easily applied after the tube sections 10 and 11 are affixed at one end in a permanent relation. The structure is light, and the joints are of a character which will efficiently transfer heat through its entire wall area. When used for refrigeration, the tubes are connected with an evaporator and refrigerant flows through the tube loop.

Although this invention has been described in connection with certain specific embodiments, the principles involved are susceptible of numerous other applications which will readily occur to persons skilled in the art, and the invention is therefore to be limited only as indicated by the scope of the appended claim.

What I claim is:—

In a heat transfer structure, a pair of fixed tube sections having straight parallel ends of uniform diameter, fin plates having openings therein through which the straight ends of the tube sections project, a U-shape tube having its ends telescoping the straight ends of the tube sections, said telescoping U-shape tube ends each being formed with a circularly extending bead having an opening therethrough, said beads forming a recess surrounding the telescoped tube section ends, and a solid sealing means filling the recesses, said sealing means being introduced through the openings in fluid form.

FRANKLIN G. SLAGEL.